Patented May 17, 1932

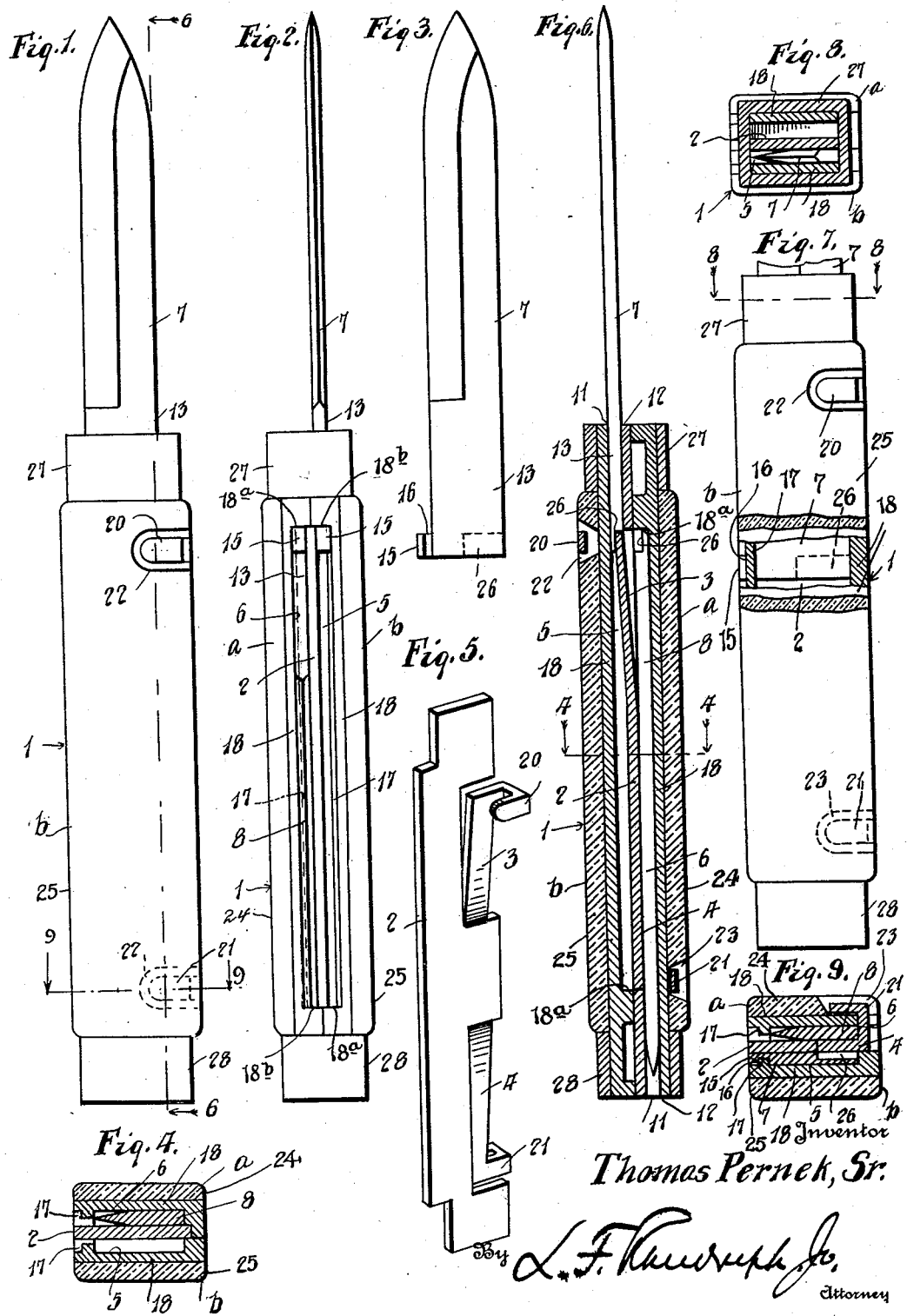

1,859,158

UNITED STATES PATENT OFFICE

THOMAS PERNEK, SR., OF HARTFORD, CONNECTICUT

SAFETY POCKET KNIFE

Application filed March 29, 1928. Serial No. 265,690.

This invention relates to improvements in pocket knives and has for its object to provide a safety pocket knife.

Another object of the invention is to provide a safety pocket knife which may be operated with one hand, if desired, and which will eliminate the danger of the ordinary pointed blade being sprung back upon the fingers of the user.

A still further object of the invention is to provide a pocket knife which will be efficient in operation, strong of construction, and cheap to manufacture.

A further object of the invention is to provide an automatically operated pen knife which will assume open or closed position at the will of the operator, with little efforts on his part.

With the above and such other objects in view as may hereinafter more fully appear, I have invented the device shown in the accompanying illustration in which:

Figure 1 is a side elevational view of the pen knife, one of the blades being shown in open position;

Figure 2 is a front elevational view thereof;

Figure 3 is a side elevational view of the blade removed from the handle;

Figure 4 is a section on line 4—4 of Figure 6.

Figure 5 is a perspective view of the central wall of the handle member;

Figure 6 is a longitudinal sectional view on the line 6—6 of Figure 2;

Figure 7 is a side elevational view with the blades withdrawn;

Figure 8 is a section on line 8—8 of Figure 7; and

Figure 9 is a transverse section through the knife at the recess 23.

Like reference characters indicate like parts throughout the following specification and in the several views in the drawings in which my improved knife consists of a handle 1, having a central wall 2, preferably of spring steel, or other equally good material, and provided with struck out tongues 3 and 4, bent in opposite directions into the blade-receiving recesses 5 and 6, in which the blades 7 and 8 are slidably seated, the recesses 5 and 6 alining with passages 11 in the ends 12 of the handle 1. The blades 7 and 8 are each provided with a shank 13. A projection 15 is also provided on shank 13 and has a groove 16 seating over and slidable upon a tongue or rib 17 on the side wall 18 of said recesses 5 and 6. Side walls 18 have inwardly projecting portions 18$^a$ and 18$^b$ that space said walls from central wall 2 to form said recesses 5 and 6, and the shoulders 18$^a$ serve to limit the retractive movement of the blades into the handle, while shoulders 18$^b$ by engagement with projections 15 serve to provide therewith a stop, to limit the outward movement of said blades 7 or 8. The members 3 and 4 are provided with extensions 20 and 21, crossing said recesses 5 and 6 respectively, and having the terminals bent at right angles in the apertures 22 and 23 in the outer walls 24 and 25 of the handle 1, so that upon pressing either of said members 20 or 21 the spring tongues 3 or 4 may be released from pressure upon its blade 7 or 8, in order that upon returning the proper end of the handle down said blade will drop out of its recess to the limit of its movement, then upon removing the finger from the control member 20 or 21 its spring tongue 3 or 4 will drop into the space 26 in rear of the shank 13 of the projected blade and lock the blade in its outer position. Upon holding the projected blade up and pressing upon the control member 20 or 21, the blade will be released and allowed to fall within its recess in the handle.

Ferrules 27 and 28 are provided on either end of the handle 1, adapted to hold the inner wall 2, and the outer walls 18 together. On the outside of the walls 18, and between the ferrules 27 and 28, is fixed, by means of rivets, or other suitable means, the trimming $a$ and $b$ for the handle 1. The trimmings $a$ and $b$ may be made of glass or porcelain, as indicated by the conventional crosshatching in the drawings, or of any other well known material, and may be secured to the outer sides of walls 24 and 25 in any suitable manner such for instance as by rivets (not shown).

While I have shown and described the preferred embodiment of my invention, it will be understood that minor changes in the details of construction, combination and arrangement of parts may be made without departing from the spirit and scope of the invention as claimed or sacrificing any of the advantages thereof.

Having described my invention that which I claim to be new and desire to procure by Letters Patent is:

1. In a pen knife, a handle having a central wall, tongues struck out from said wall, said handle having recesses therein on either side of said wall, said tongues being bent in opposite directions into said recesses, and a blade slidably mounted in each of said recesses and engageable by said tongues to hold said blades in adjusted positions in the handle.

2. As in claim 1 and a passage in the end of said handle in alinement with each of said recesses for the projection of the blades from the recesses, projections on the shanks of said blades, and tongues on the side walls of said handle and cooperating with said projections to guide the blades.

3. As in claim 1 and a passage in the end of said handle in alinement with each of said recesses, projections on the shanks of said blades, and tongues on the side walls of said handle, said projections having grooves seating over and slidable upon said tongues.

4. In a pen knife, a handle having a central wall, tongues struck out from said wall, said handle having recesses therein on either side of said wall, said tongues being bent in opposite directions into said recesses, a blade slidably mounted within each of said recesses, a passage in the ends of said handle adapted to align with one of said recesses, shoulders provided on said handle, projections on the shanks of said blade, and tongues on the side walls of said handle, said projections having grooves seating over and slidable upon said tongues, said projections also engageable with said shoulders to provide stops to limit the outward movement of said blades.

5. As in claim 4 and extensions on said tongues crossing said recesses the terminals of which are bent at right angles, the handle having apertures in its outer walls to receive said extensions.

6. A pocket knife embracing a handle having recesses therein, side walls for the recesses having ribs and blades slidable in the recesses having grooves cooperating with said ribs.

7. A pocket knife embracing a handle having recesses therein, side walls for the recesses having ribs and blades slidable in the recesses having grooves cooperating with said ribs, and springs normally pressing against said blades.

8. A pocket knife embracing a handle having recesses therein, side walls for the recesses having ribs and blades slidable in the recesses having grooves cooperating with said ribs, springs normally pressing against said blades, and means for releasing the springs from said blades.

9. A pocket knife embracing a handle having recesses therein, side walls for the recesses having ribs and blades slidable in the recesses having grooves cooperating with said ribs, springs normally pressing against said blades, and means for releasing the springs from said blades, said means projecting through said handle.

In testimony whereof I affix my signature.

THOMAS PERNEK, Sr.